United States Patent [19]

Thompson

[11] Patent Number: 5,050,439
[45] Date of Patent: Sep. 24, 1991

[54] CORIOLIS-TYPE MASS FLOWMETER CIRCUITRY

[75] Inventor: Duane T. Thompson, Franklin, Mass.

[73] Assignee: The Foxboro Company, Foxboro, Mass.

[21] Appl. No.: 420,569

[22] Filed: Oct. 12, 1989

Related U.S. Application Data

[60] Division of Ser. No. 116,257, Oct. 29, 1987, Pat. No. 4,911,020, which is a continuation-in-part of Ser. No. 923,847, Oct. 28, 1986, Pat. No. 4,891,991.

[51] Int. Cl.$^5$ .............................................. G01F 1/84
[52] U.S. Cl. ............................................... 73/861.38
[58] Field of Search ........................ 73/861.38, 861.37

[56] References Cited

U.S. PATENT DOCUMENTS

| Re. 31,450 | 11/1983 | Smith | 73/861.38 |
|---|---|---|---|
| 3,509,767 | 5/1970 | Greer | 73/705 |
| 3,927,565 | 12/1975 | Pavlin et al. | 73/194 M |
| 4,127,028 | 11/1978 | Cox et al. | 73/861.38 |
| 4,187,721 | 2/1980 | Smith | 73/194 B |
| 4,192,184 | 3/1980 | Cox et al. | 73/194 B |
| 4,252,028 | 2/1981 | Smith et al. | 73/861.38 |
| 4,311,054 | 1/1982 | Cox et al. | 73/861.38 |
| 4,422,338 | 12/1983 | Smith | 73/861.38 |
| 4,491,009 | 1/1985 | Ruesch | 73/32 A |
| 4,655,089 | 4/1987 | Kappelt et al. | 73/861.38 |
| 4,660,421 | 4/1987 | Dahlin et al. | 73/861.38 |
| 4,691,578 | 9/1987 | Herzl | 73/861.38 |
| 4,703,600 | 11/1987 | Brenneman | 73/861.38 |
| 4,747,312 | 5/1988 | Herzl | 73/861.38 |
| 4,756,197 | 7/1988 | Herzl | 73/861.38 |
| 4,759,223 | 7/1988 | Frost | 73/861.38 |
| 4,777,833 | 10/1988 | Carpenter | 73/861.38 |
| 4,782,711 | 11/1988 | Pratt | 73/861.38 |
| 4,817,448 | 4/1989 | Hargarten et al. | 73/861.38 |
| 4,823,614 | 4/1989 | Dahlin | 73/861.38 |
| 4,831,855 | 5/1989 | Dahlin | 73/861.38 |

FOREIGN PATENT DOCUMENTS

| 0212782 | 3/1987 | European Pat. Off. |
| WO8505677 | 12/1985 | PCT Int'l Appl. |
| WO8600699 | 1/1986 | PCT Int'l Appl. |
| WO8702469 | 4/1987 | PCT Int'l Appl. |

Primary Examiner—Herbert Goldstein
Attorney, Agent, or Firm—Fish & Richardson

[57] ABSTRACT

Displacement sensors at opposite ends of at least one oscillating conduit produce output signals from which the drive component or the Coriolis component, or preferably both, are recovered. An oscillatory drive signal is derived from the drive component, and a mass flow signal is derived from the Coriolis component. The remaining drive component in a combination of the two sensor outputs is nulled by amplitude control of one sensor output. Two force drivers at opposite ends of the conduit are driven by complementary drive signals to which a perturbation signal is added. The remaining perturbation signal in a combination of the two sensor outputs is nulled by adding compensation to both drive signals to eliminate drive force imbalance. Synchronous demodulation is used in the preferred embodiment to detect several parameters in a combination of the sensor outputs. In a dual loop configuration, pairs of sensors and/or force drivers are located at opposite ends of each conduit section.

21 Claims, 12 Drawing Sheets (SERIES FLOW)

PERPENDICULAR

IN-LINE

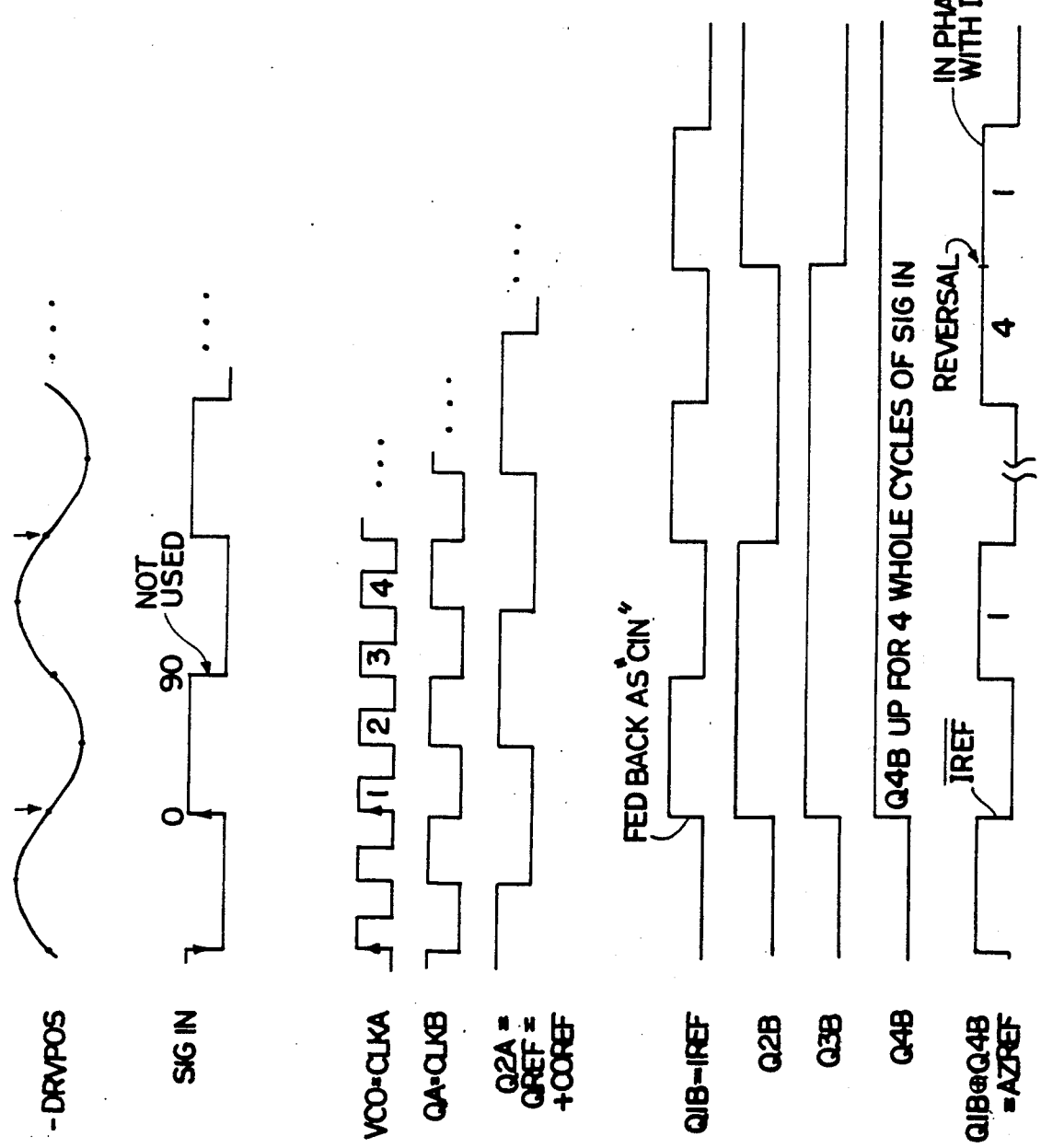

5,050,439

CORIOLIS-TYPE MASS FLOWMETER CIRCUITRY

CROSS-REFERENCE TO RELATED APPLICATION

The present application is a division of application Ser. No. 07/116,257, filed Oct. 29, 1987, now U.S. Pat. No. 4,911,020, which is a continuation-in-part of U.S. patent application Ser. No. 923,847 filed Oct. 28, 1986, now U.S. Pat No. 4,891,991 by Wade M. Mattar et al. entitled "Coriolis-Type Mass Flowmeter" assigned to the assignee of the present application and incorporated herein by reference in its entirety.

BACKGROUND OF THE INVENTION

The present invention relates to electronic control and sensing circuitry for oscillating conduit Coriolis-type mass flowmeters.

A mass flowmeter is an instrument which provides a direct indication of the quantity or mass, as opposed to volume or velocity, of material being transferred through a pipeline.

One class of mass measuring flowmeters is based on the well-known Coriolis effect. Coriolis forces are exhibited in the radial movement of mass on a rotating body. Imagine a planar surface rotating at constant angular velocity about an axis, perpendicularly intersecting the surface. A mass travelling radially outward on the surface at what appears to be a constant linear speed actually speeds up in the tangential direction because the larger the radial distance of a point from the center of rotation, the faster the point must travel. The increase in velocity, however, means that the mass has been indirectly accelerated. The acceleration of the mass generates a reaction force, called the Coriolis effect, in the plane of rotation perpendicular to the instantaneous radial movement of the mass. In vector terminology, the Coriolis force vector is the cross-product of the angular velocity vector (parallel to the rotational axis) and the velocity vector of the mass in the direction of its travel with respect to the axis of rotation (e.g., radial). Consider the mass as a person walking a straight line radially outward on a turntable rotating clockwise at a constant rate and the reaction force will be manifested as a listing to the left to compensate for acceleration.

The potential applicability of the Coriolis effect to mass flow measurement was recognized long ago. If a pipe is rotated about a pivot axis orthogonal to the pipe, material flowing through the pipe becomes a radially travelling mass which, therefore, experiences acceleration. The Coriolis reaction force experienced by the travelling fluid mass is transferred to the pipe itself as a deflection or offset of the pipe in the direction of the Coriolis force vector in the plane of rotation.

Coriolis-type mass flowmeters induce a Coriolis force in two significantly different ways: by continuously rotating or by oscillating back and forth. The principal functional difference is that the oscillating version, unlike the continuously rotating one, has periodically (i.e., usually sinusoidally) varying angular velocity producing, as a result, a continuously varying level of Coriolis force. A major difficulty in oscillatory systems is that the Coriolis effect is relatively small compared not only to the drive force but even to extraneous vibrations. On the other hand, an oscillatory system can employ the bending resiliency of the pipe itself as a hinge or pivot point for oscillation and thus obviate separate rotary or flexible joints and moreover offers the possibility of using the resonant frequency of vibration to reduce drive energy.

Several aspects of oscillating conduit Coriolis mass flowmeters require electronic instrumentation. First, inducing the oscillation in the conduit requires a drive control system sensitive to spurious vibration and capable usually of maintaining a constant amplitude as well as frequency of oscillation. Second, the movement of the conduit has to be detected and measured in such a way as to reveal the amount of the extraneous deflection or offset of the conduit due exclusively to Coriolis force. This application presents electronic instrumentation for implementing drive control and sensing functions in oscillating conduit Coriolis mass flowmeters.

SUMMARY OF THE INVENTION

A general feature of the invention is a signal processing and control system for a Coriolis-type mass flowmeter characterized by oscillating several conduit sections in synchronism, detecting displacement of respective ends of the sections and producing two corresponding complementary sensor outputs for each section, each including a drive component and a Coriolis component, combining corresponding ones of the displacement sensor outputs for both conduit sections and recovering at least one of the components from the two combined sensor outputs.

Preferred embodiments of the invention include the following features taken individually and in various combinations. An oscillatory drive signal is derived from the drive component and a mass flow signal is derived from the Coriolis component. Preferably, a mass flow indication is derived by synchronous demodulation of the recovered Coriolis component with respect to a quadrature reference signal. An oscillatory drive signal is derived from the recovered drive component. The natural resonant frequency of the conduit section is tapped by proportioning the drive signal to the first derivative of the recovered drive component. In the preferred embodiment, a dual loop configuration, pairs of sensors and force drivers, are located at opposite ends of each conduit section. The outputs of sensors at corresponding ends are summed. Complementary drive signals are applied to the respective drivers at opposite ends.

Another general feature of the invention is related to providing gain balance between the sensor channels. Any remnant of the drive component remaining in a combination of the two sensor outputs designed to cancel the drive components is nulled by amplitude control of one sensor output or output channel for a combination of corresponding sensor outputs. In a preferred embodiment of this system, a channel gain imbalance signal is developed and employed to control the amplitude of one sensor output. In the preferred system, the recovered Coriolis component is synchronously demodulated with respect to an in-phase reference signal to generate a balance error signal.

Another general feature of the invention provides compensation for drive force imbalance. In particular, two force drivers at opposite ends of the conduit section are driven by complementary drive signals to which a perturbation signal is added. Any remnant of the perturbation signal in a combination of the two sensor outputs designed to cancel the drive components is nulled by adding compensation to both drive signals to eliminate drive force imbalance. In the preferred embodiment, the perturbation signal is out-of-phase with the drive signal, preferably in quadrature therewith. Since such a perturbation signal would cause a gradual rotation of drive phase if continuously applied, the polarity of the perturbation signal is periodically reversed. In the preferred system, the recovered Coriolis component is synchronously demodulated with a reference signal replicating the phase and frequency of the perturbation signal to produce a drive force balance error signal. A compensation signal is derived by algebraic combination of the error signal with the drive signal.

Another general feature of the invention is the technique of synchronously demodulating one of the recovered components with respect to a reference signal having a predetermined phase relationship with the other component. For example, the recovered Coriolis component is synchronously demodulated in the preferred embodiment with a reference in quadrature with the recovered drive component to yield a mass flow indication. A specific feature of the preferred embodiment of the invention is the provision of plural synchronous demodulators employing a plurality of respective reference signals each having a different phase relationship with the other recovered component. One or more of these reference signals is developed by generating an intermediate signal, with a voltage controlled oscillator, for example, phase-locked to the recovered drive component and at a frequency which is a multiple of the frequency of the recovered drive component, counting transitions of the intermediate signal to produce a plurality of counter outputs, and logically combining the counter outputs to produce one or more reference signals at the same frequency and with a selected phase relationship to the recovered drive component for use as a synchronous demodulator reference.

In the preferred embodiment, the drive control and measurement system is employed with a dual parallel loop, dual drive Coriolis mass flowmeter in which each loop has an oscillating straight section with sensors and drivers located respectively at both ends of the straight section. Sensor outputs and drive inputs for corresponding ends of the two loop sections are connected in parallel to form respective channels. In the embodiment specific to the configuration having two loops and two pairs of displacement sensors, output signals from sensors at corresponding ends are summed and demodulated before being combined with demodulated summed output signals from the sensors at the opposite ends to yield sum and difference signals representing, by design, Coriolis mode deflection and the sensed drive component. The sensed drive component signal is differentiated and passed through a linear attenuator controlled by comparison of the full-wave-rectified drive signal component to a DC reference voltage. Complementary versions of the gain-controlled-differentiated drive signal component are applied respectively to force drivers for corresponding ends of the loop section.

The Coriolis mode deflection signal in the preferred embodiment is demodulated synchronously with three different reference signals: a first signal in quadrature with the sensed drive component (yielding flow data), a second signal in phase with the sensed drive component (yielding gain imbalance data), and third signal alternately in phase and 180° out of phase with the sensed drive component (yielding drive imbalance data). The gain of one channel is adjusted by the second demodulator output to improve gain balance. A perturbation signal is applied to both channels corresponding to opposite ends of the loop sections in quadrature with the sensed drive component with phase reversal every few cycles. The resulting third demodulator output is combined with the drive signals to reduce drive imbalance.

The signal processing and control system based on phase measurements, according to the invention, eliminates the need for tracking absolute amplitude of tube deflections. In the preferred system, the same signals which are employed to derive the mass flow indication develop the self-oscillating drive signal. The parallel arrangement of drivers and/or sensors for two loops enhances the symmetry and balance of the drive signals and increases the number of shared common elements. Imbalances inherent in the system due to differences in channel gain and drive force are automatically reduced by closed loop control systems which improve the accuracy and reliability of the flowmeter.

Other advantages and features will become apparent from the following description of the preferred embodiment and from the claims.

DESCRIPTION OF THE PREFERRED EMBODIMENTS

We first briefly describe the drawings.

FIG. 19 is a timing diagram for representative signals in the circuit of FIG. 18.

MECHANICAL DESIGN

A specific tubular configuration is described herein in two orientations, perpendicular and in-line with respect to the direction of the process flow, i.e., the direction of flow in a straight section of pipeline in which the meter is to be inserted. The implementations illustrated herein are designed for one inch pipelines for a variety of products including petroleum based fuels, for example. The flowmeter described herein, of course, is applicable to a wide variety of other specific designs for the same or different applications.

Figure 1:
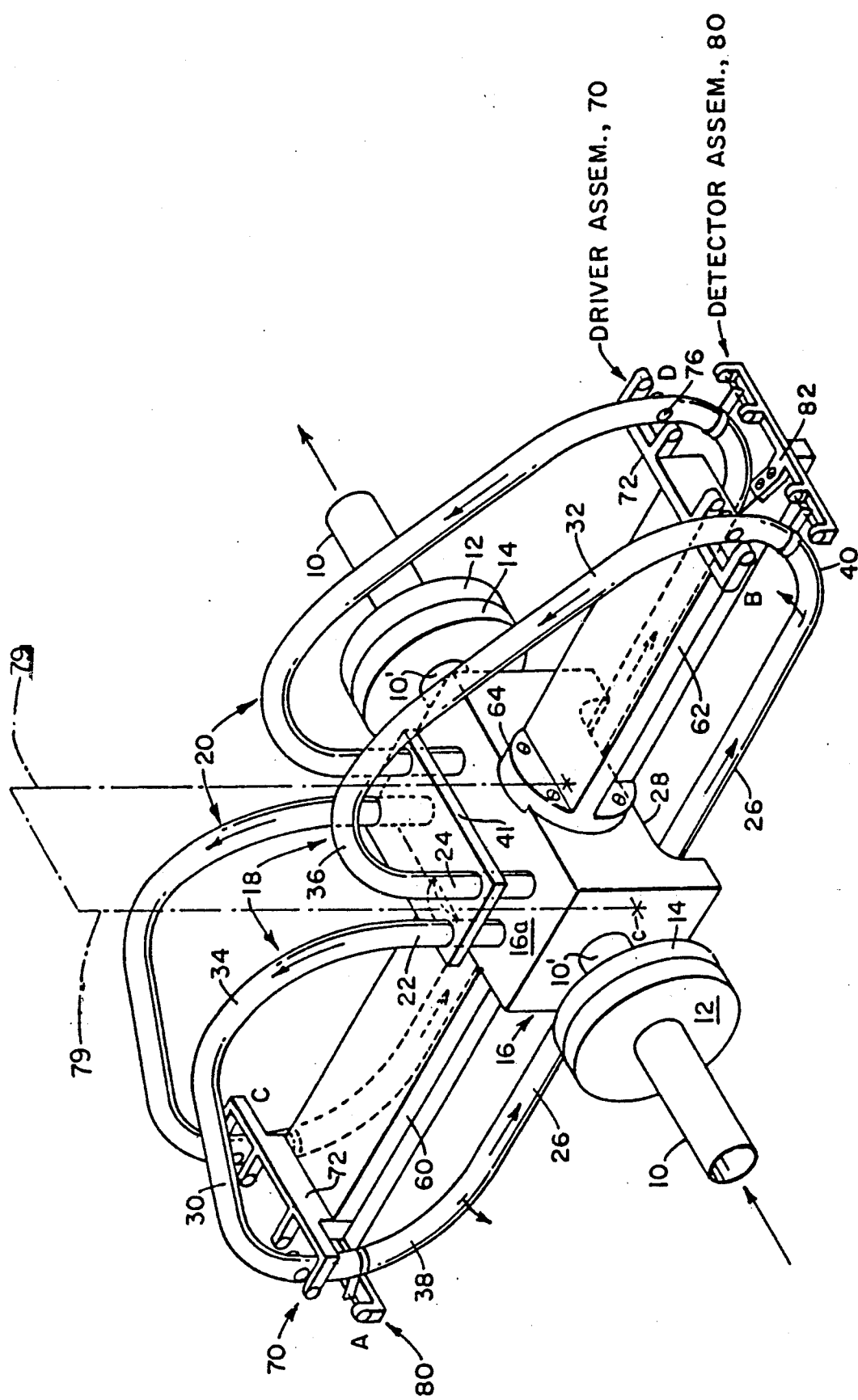
FIG. 1 is an oblique isometric view of a double loop, dual drive, central manifold, Coriolis effect mass flowmeter.

FIG. 1 illustrates a double loop, dual drive/detector system with torsional loading of the tube ends where they are connected to a single rigid central manifold connected in line with the process flow. The same embodiment is shown in FIGS. 1, 2 and 3-6 with more detail being provided in FIGS. 4-6.

The mass flowmeter of FIG. 1 is designed to be inserted in a pipeline 10 which has had a small section removed or reserved to make room for the meter. The pipeline 10 is equipped with opposing spaced flanges 12 which mate with mounting flanges 14 welded to short sections of pipe 10' connected to a massive central manifold block 16 supporting the two parallel planar loops 18 and 20. The configuration of loops 18 and 20 is essentially identical. Thus, the description of the shape of loop 18 holds true for loop 20 as well. Manifold block 16 is preferably a casting in the shape of a solid retangular block with a flat horizontal upper surface or top 16a and integral pipe sections 10'. The ends of loop 18 comprise straight preferably vertical parallel inlet and outlet sections or legs 22 and 24 securely affixed, e.g., by butt welding, to the top of the manifold 16a in close proximity to each other. The base of loop 18 is a long straight section 26 passing freely through an undercut channel 28 in the bottom face of the casting 16. The long straight section 26 at the base of the loop 18 is connected to the upright legs 22 and 24 by respective diagonal sections 30 and 32. The four junctions between the various straight segments of the loop 28 are rounded by large radii turns to afford as little resistance to flow as posssible. In particular, upright legs 22 and 24 are connected to the respective diagonal segments 30 and 32 by means of apex turns 34 and 36 respectively. The ends of the long straight base section 26 are connected to the respective ends of the diagonal segments 30 and 32 by lower rounded turns 38 and 40.

The parallel inlet/outlet ends 22, 24 of both loops 18 and 20 pass through a correspondingly apertured isolation plate or node plate 41 which is parallel to surface 16a and spaced therefrom by a predetermined distance, for example, 0.825 inch in a one-inch pipe embodiment. The node plate serves as a stress isolation bar and defines a common mechanical ground for each loop.

An advantage of the node plate 41 as mechanical ground compared to the casting 16 is that the interconnection of the plate and inlet/outlet legs 22, 24 is by way of completely external circular weldments on the upper and lower surfaces of the plate, forming two external rings around each leg. In contrast, the butt welds of the tube ends to the bosses on the casting 16 are exposed on the interior to the process fluid which will tend in time to corrode the weldments faster if they are in constantly reversing torsional stress.

Figure 2:
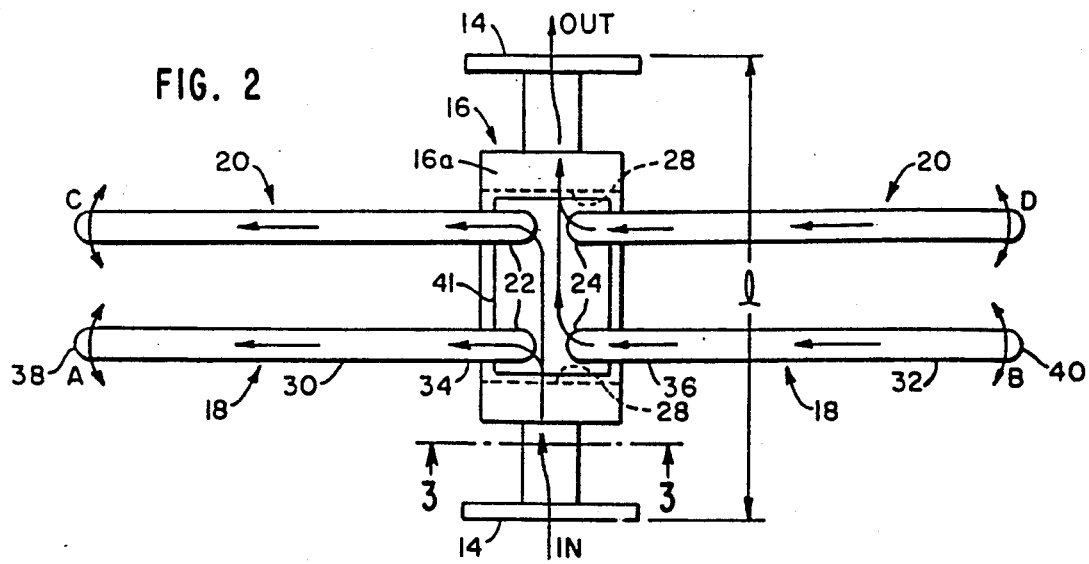
FIG. 2 is a plan schematic view of the flowmeter of FIG. 1 with a parallel flow manifold block.

Manifold casting 16 is channeled inside so that the inlet stream is diverted in parallel to upright legs 22 of loops 18 and 20 as shown in FIG. 2. The loop outlet from upright legs 24 is combined and diverted to the outlet of the meter, back to the pipeline 10. The loops 18 and 20 are thus connected in parallel, flow-wise as well as geometry-wise.

Figure 2A:
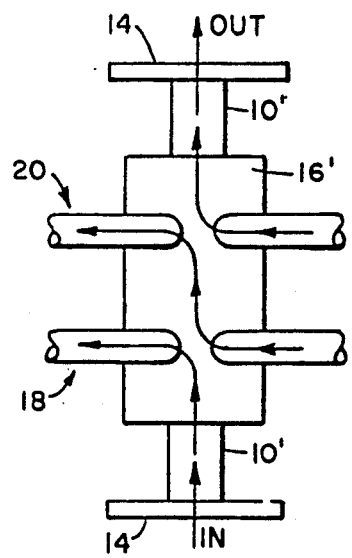
FIG. 2A is a plan schematic fragmentary view like that of FIG. 2 with a series flow manifold block.
Figure 3:
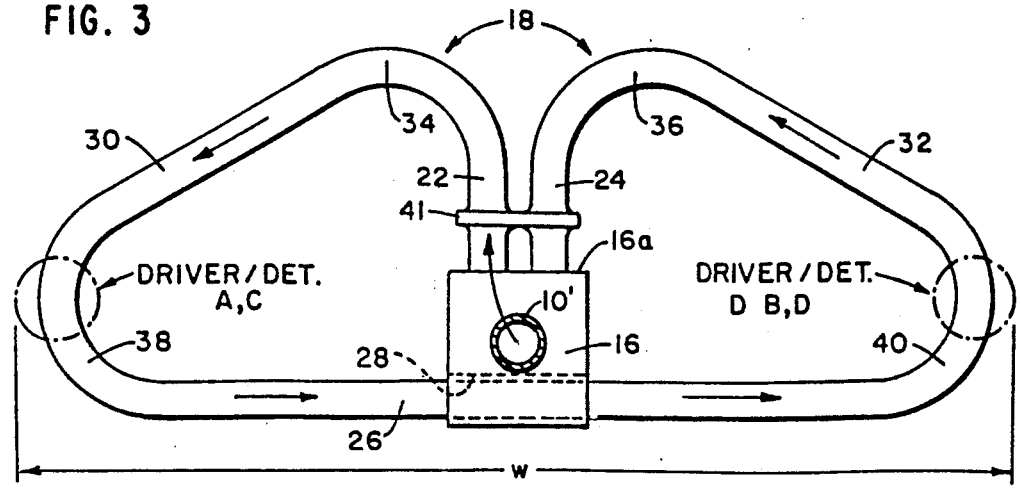
FIG. 3 is a side schematic view of the apparatus of FIG. 2 in elevation taken in the indicated direction along lines 3—3.

FIG. 2A shows a variation in which the channels in manifold block 16' are modified for series flow through the loops. Blocks 16 and 16' are otherwise interchangeable.

Figure 4:
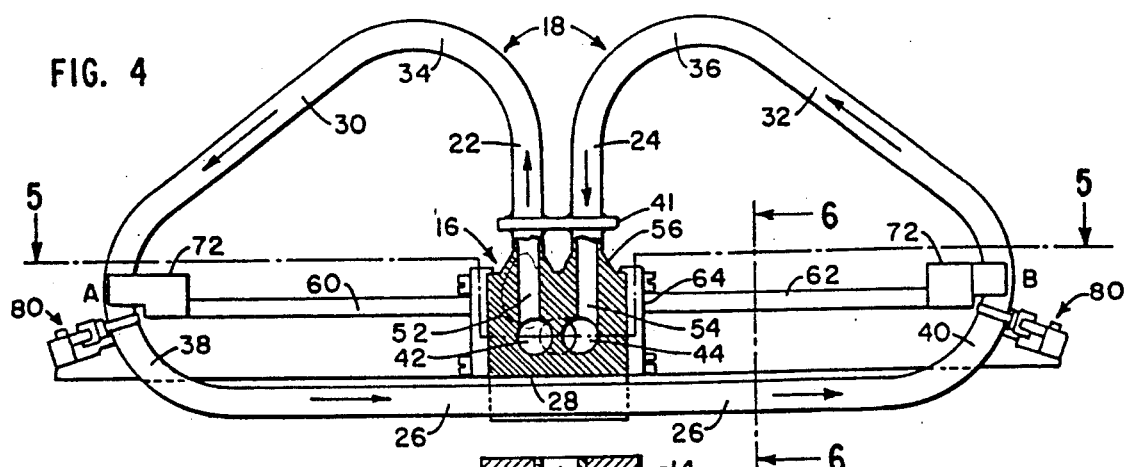
FIG. 4 is a side elevational view of the apparatus of FIG. 1 in more detail with portions of the central manifold assembly broken away to reveal the inlet and outlet chambers.
Figure 5:
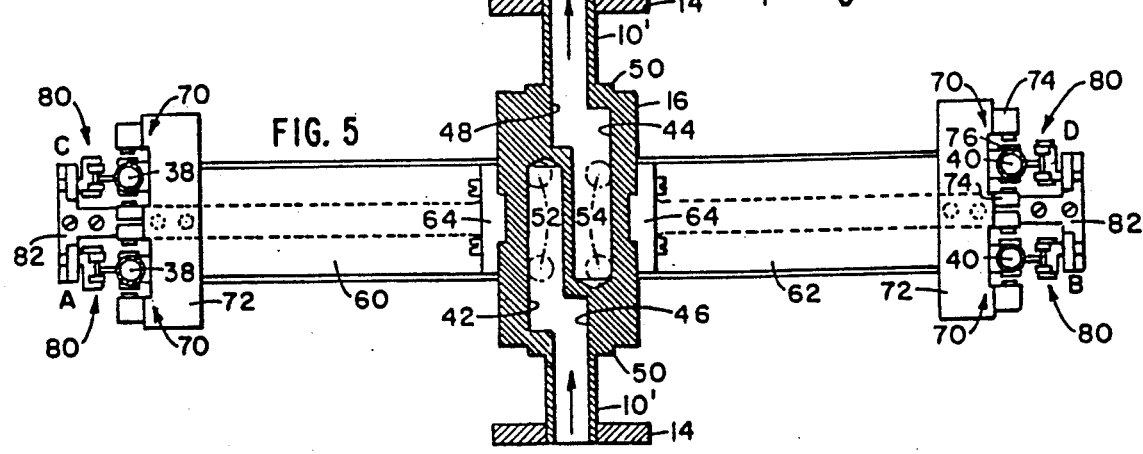
FIG. 5 is a sectional view with portions in plan taken in the direction indicated along the lines 5—5 of FIG. 4.
Figure 6:
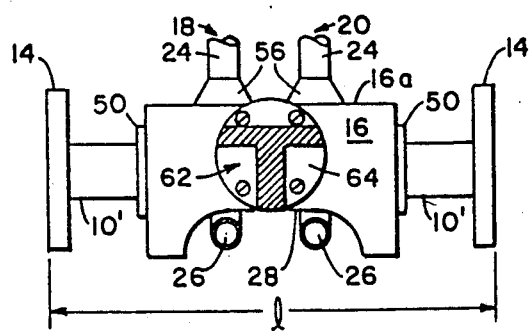
FIG. 6 is a side elevational view of the central manifold assembly with the tubes and support arm in section taken in the direction indicated along the lines 6—6 of FIG. 4.

The manifold casting 16 is shown in FIGS. 4 and 5. A pair of offset overlapping channels 42 and 44, parallel to the process line, are connected to the respective integral inlet and outlet pipe sections 10' by means of larger offset openings 46 and 48. Channels 42 and 44 are in communication respectively with the inlet and outlet of the meter to form intake and exhaust manifolds. A pair of vertical spaced ports 52 through the casting 16 communicate the inlet legs 22 of the loops 18 and 20 with the intake manifold formed by channel 42. Likewise, a pair of vertical spaced ports 54 communicate the upright outlet legs 24 of loops 18 and 20 with the exhaust manifold formed by channel 44. As shown in FIGS. 4 and 6, the ends of the two pairs of upright legs 22 and 24 are butt welded to hollow conical bosses 56 rising integrally from the casting coaxially with respective ports 52 and 54.

The electrical driver/detector assemblies are supported independently on the outboard ends of rigid opposed arms 60 and 62 in the form of T-beams securely attached to opposite faces of the manifold casting 16 by disk shaped mounting flanges 64. Flanges 64 and casting 16 may be matingly keyed as shown in FIG. 5 for extra stability. Cantilevered arms 60 and 62 extend parallel within the planes of the two loops 18 and 20 and the vertical plates of the arms pass between the corners 38 and 40 where the driver/detector assemblies are located for both loops.

As shown in FIGS. 1 and 5 at the end of the upper deck of each cantilevered arm 60, 62, two identical solenoid type driver assemblies 70 are located and held in position by driver brackets 72. Each driver comprises a pair of push/pull solenoid coils and pole pieces 74 which act on ferromagnetic slugs 76 welded onto opposite sides of the lower turn 38, 40. Thus, there are eight independent drivers, one pair for each end of each loop 18, 20. Each driver imparts reciprocal sideways motion to the tube between the slugs 76.

Figure 6A:
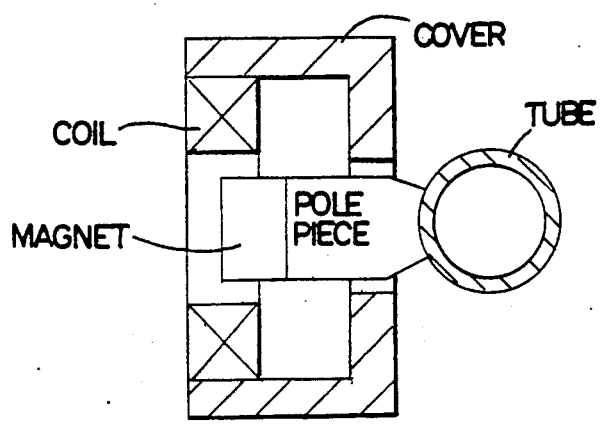
Figure 15:
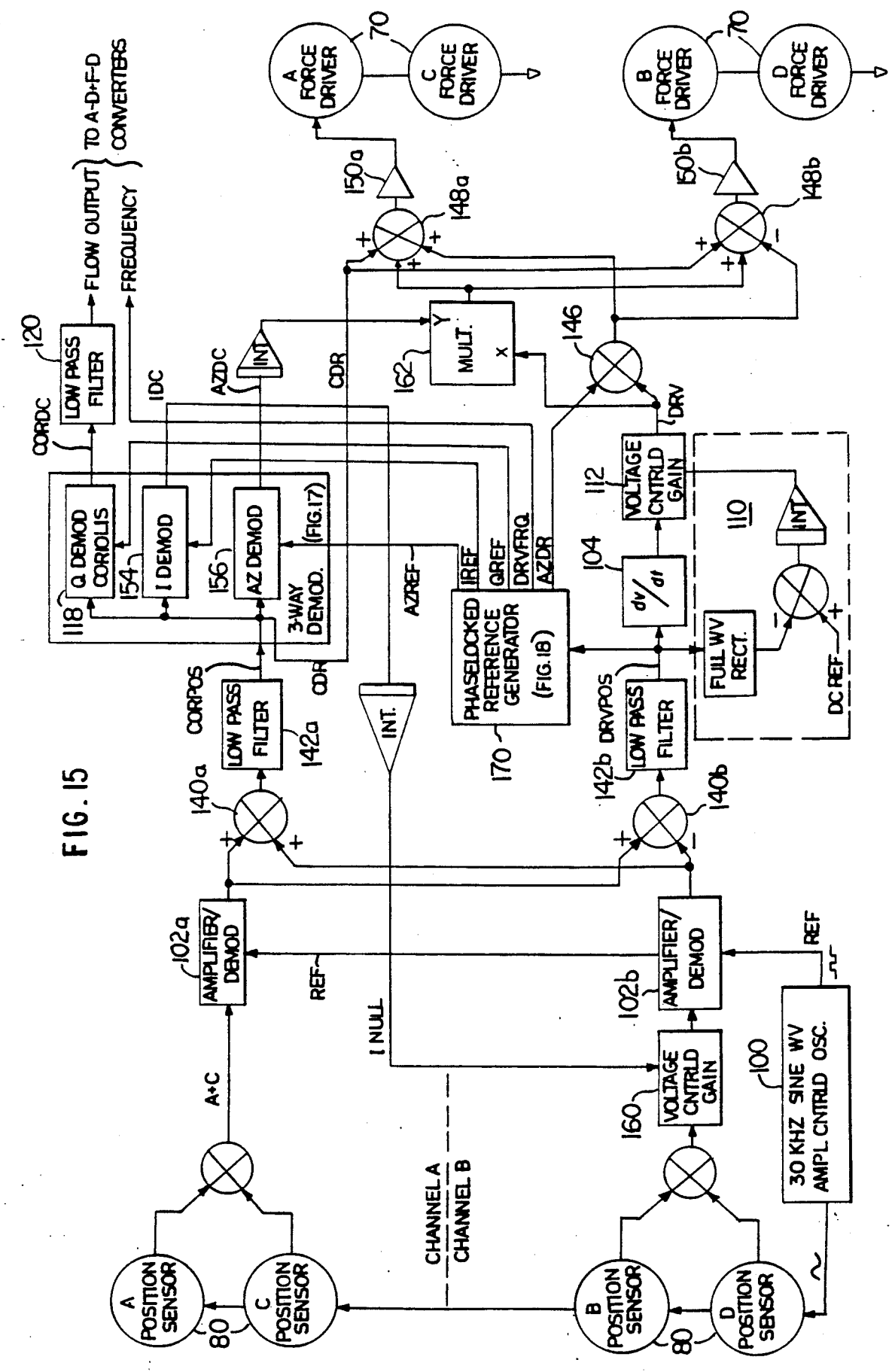
FIG. 15 is a functional block diagram of another electrical circuit for the drivers and detectors associated with the perpendicular and in-line embodiments of FIG. 1 and FIG. 7.

Problems have surfaced with solenoid drivers of the type shown in FIGS. 1 and 5. The solenoid actuators are highly nonlinear and force is dependent on static positions. These problems are alleviated by changing to a moving magnet design. The magnet may be mounted to and extend laterally from the side of the tube at the location of one of the slugs 76 inside a stationary coil with a ferromagnetic cover, as shown schematically in FIG. 6A. In this embodiment, the drivers or drive motors as they are more properly termed, are energized by passing current through the coils in a similar manner. However, only one drive motor is needed for each end of each tube and coils for drive motors or corresponding ends of respective tubes are electrically connected in series rather than in parallel, as indicated in FIG. 15, for example.

By energizing the driver pairs on opposite ends of the same tube with current of equal magnitude but opposite sign (180° out of phase), straight section 26 is caused to rotate about its coplanar perpendicular bisector 79 which intersects the tube at point c as shown in FIG. 1. The drive rotation is thus preferably in a horizontal plane about point c. The perpendicular bisectors for the straight sections of both loops preferably lie in a common plane of symmetry for both loops as noted in FIG. 1.

Repeatedly reversing (e.g., controlling sinusoidally) the energizing current of the drives 70 causes the straight section 26 of the loop 18 to execute an oscillatory motion about point c in the horizontal plane. The motion of each straight section 26 sweeps out a bow tie shape. The entire lateral excursion of the loop at the corners 38 and 40 is small, on the order of ⅛ of an inch for a two foot long straight section 26 for a one inch pipe. This displacement is coupled to the upright parallel legs 22 and 24 as torsional deflection about the axes of the legs 22 and 24 beginning at the node plate 41. The same type of oscillatory motion is induced in the straight section of the loop 20 by the other respective pair of complementary drives 70 supported on the outer ends of the upper deck of the cantilevered arms 60 and 62, respectively.

The central vertical portion of the T-beam extends between the corners 38 and 40 of the two loops 18 and 20, respectively, and supports detector assemblies 80 on brackets 82 at the respective ends of the arms 60 and 62. Each of the four detector assemblies 80 includes a position, velocity or acceleration sensor, for example, a variable differential transformer having a pair of coils mounted on the stationary bracket 82 and a movable element between the coils affixed to the tube corner 38, 40. The movable element is connected to a strap welded to the corner 38, 40 of the loop as shown. Conventional optical, capacitive or linear variable displacement transducers (LVDT's) may be substituted. It is desirable for the position detector to have an output that is linear with respect to displacement over the limited deflection range and relatively insensitive to motions substantially skewed with respect to the plane of the respective loop. However, the implementation of the detector is a matter of design choice and does not form a part of the present invention.

The driver detector assembly pairs 70, 80 for loop 18 are designated A and B corresponding to the opposite ends of the straight section 26 of loop 18. Likewise, the driver/detector assemblies for the other parallel loop 20 are designated C and D for the left and right ends as viewed in the drawing.

Figure 7:
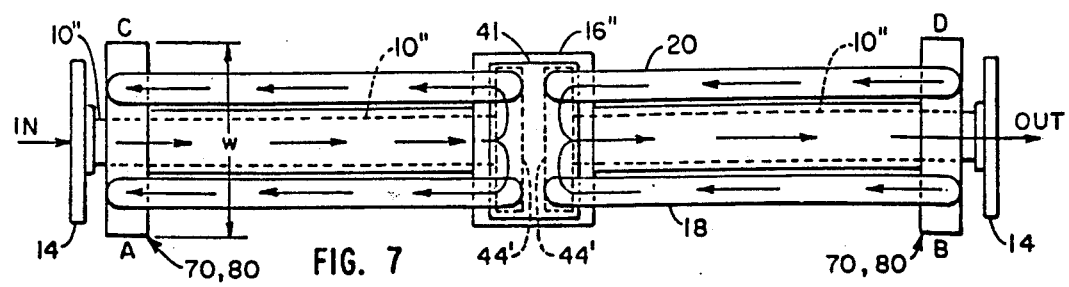
FIG. 7 is a plan view of an in-line embodiment of a double loop, dual drive Coriolis effect mass flowmeter in which the planes of the loops are oriented parallel to the process line.
Figure 8:
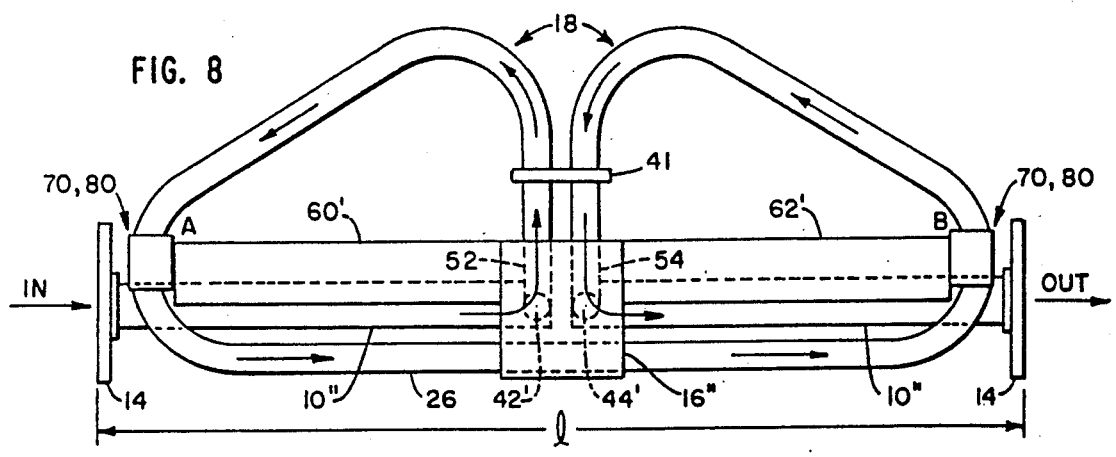
FIG. 8 is a side elevational view of the apparatus of FIG. 7.

An alternate embodiment of the same parallel loop configuration shifted 90° is shown in FIGS. 7 and 8. Here, the planes of the loops 18 and 20 are arranged parallel to the process flow direction. In-line pipe section 10″ connecting the mounting flange to the somewhat abbreviated manifold casting 16 is extended (or connected to another pipe segment) to traverse the entire length of one side of the loops 18 and 20. The motion of the loops and location of the node plate and driver/detector assemblies are identical to those in the perpendicular embodiment of FIG. 1. In the in-line embodiment of FIGS. 7 and 8, however, the driver/detector assembly arms 60′ and 62′ may, if desired, be supported over their entire length by the respective pipe section 10″. The parallel flow paths among the loops 18 and 20 in FIGS. 7 and 8 are identical to those in the embodiment of FIG. 1. The channeling of the manifold casting 16″ is somewhat different in that the manifolds 42′ and 44′ are perpendicular to the coaxial inlet/outlet lines.

Figure 9:
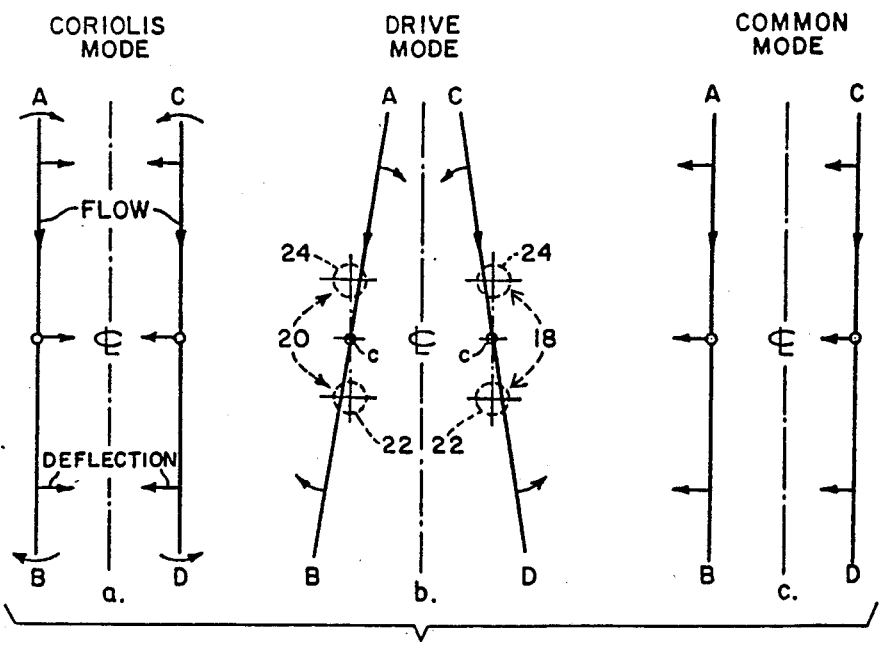
FIG. 9 is a schematic representation of three modes of motion of the apparatus of FIGS. 1 and 7.

The motion of the straight sections 26 of loops 18 and 20 for either perpendicular or in-line embodiments is shown in three modes a, b and c in FIG. 9. Drive mode b is oscillatory about point c with the two loops rotating synchronously but in the opposite sense, i.e., while loop 18 rotates clockwise, loop 20 is undergoing counterclockwise rotation. Consequently, respective ends such as a and c as shown in FIG. 9 periodically come together and go apart. This type of drive motion induces Coriolis effects in opposite directions as shown in a of FIG. 9. Coriolis mode motion thus tends to pivot the whole planes of the loops 18 and 20 respectively but in the opposite direction. The Coriolis effect is greatest when the two straight sections 26 are parallel as shown in a of FIG. 9 because the sinusoidally varying angular velocity is then at its maximum. Because the Coriolis mode motion of each loop is in the opposite direction, the straight sections 26 move slightly toward (or away from) each other as shown in a of FIG. 9.

A common mode motion undesirable in this instrument, would be one which deflected the loops in the same direction as shown in c of FIG. 9. This type of motion might be produced by an axial wave in the pipeline itself in the embodiment of FIG. 1 because the loops are oriented perpendicularly to the pipeline. The in-line embodiment of FIGS. 7 and 8 might be less susceptible to this type of extraneous vibration.

The resonant frequency of the Coriolis motion and common mode motion should be determined by design configuration to be different from the resonant frequency of the oscillatory motion of the straight section, i.e., the drive mode.

Figure 10A:
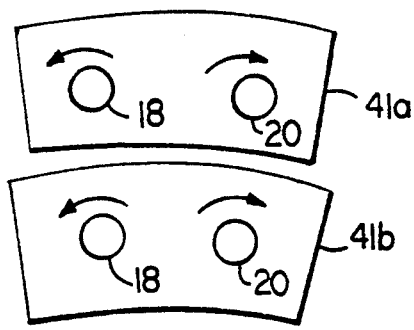
FIGS. 10A and 10B are contrasting schematic representations of dual and single node plates respectively under exaggerated torsional in-plane deflection.
Figure 10B:
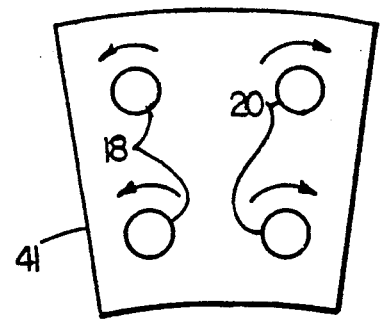

The further the displacement of the node plate 41 in FIG. 1 from the casting 16, the higher the resonant frequency of the loop in the drive mode. However, the node plate also tends to reduce the Coriolis effect displacement, the farther the plate is spaced from the casting 16. Two node plates 41a and 41b can be employed linking corresponding ends of the loops as shown in FIG. 10A. Using one plate, however, as shown in FIG. 1 and 10B, may provide better isolation. In either case, as the distance of the node plate (or plates) from the manifold increases, the meter becomes less sensitive to Coriolis mode and requires more drive force for the same tube configuration.

Figure 11A:
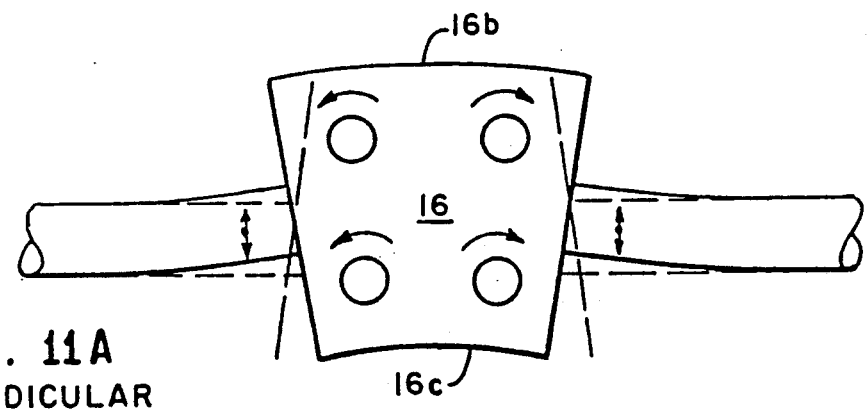
FIGS. 11A and 11B are contrasting schematic representations of the effect of exaggerated torsional deflection on the pipeline connected to the casting 16 in the perpendicular and in-line embodiments, respectively.
Figure 11B:
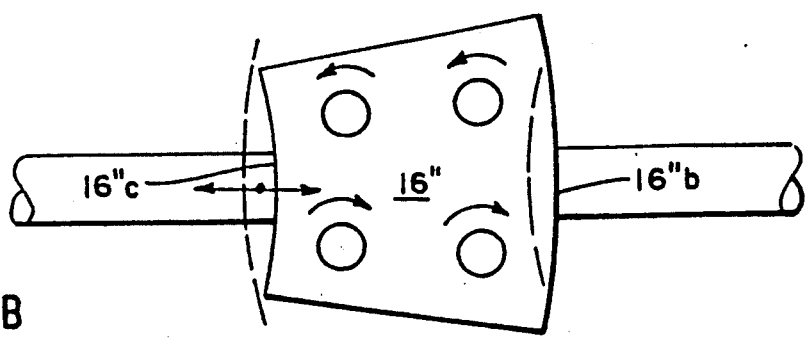

The in-line version of FIG. 7 and 8 has a possible advantage over the perpendicular model of FIG. 1 which is illustrated in FIGS. 11A and 11B. In the meter with the loops perpendicular to the process line, the torsional stress on the casting 16 tends to distort the casting slightly by placing face 16b in tension and face 16c in compression skewing the faces to which the process line is connected. While the manifold casting 16 bends less than the node plate or plates shown in FIG.

10A and 10B, a slight transverse oscillation of the pipeline from side to side could arise as illustrated in FIG. 11A. The in-line design may be less susceptible since the pipeline is connected to faces 16*b* and 16*c* which deflect more in parallel than the other two faces, as illustrated in FIG. 11B. Of course, the magnitude of the torsional stress of the casting in either case is reduced by employing a node plate or plates.

Figure 12:
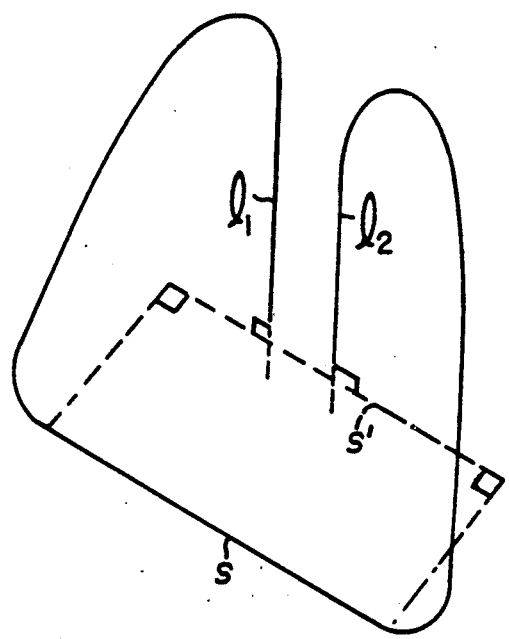
FIGS. 12 and 13 are schematic, perspective and plan representations of alternate loop configurations, respectively.

The general configuration of the loop or loops is not restricted to the "coat hanger" design of the detailed embodiment. As illustrated in FIG. 12, other configurations besides the "coat hanger" can be designed to embody the principle of an oscillating straight section with ends connected via side sections or lobes to respective parallel inlet/outlet legs $l_1$ and $l_2$ which are approximately perpendicular to the orthogonal projection s' of the straight section s in the plane of the legs. The coat hanger design is considered to be a special case of the design principle of FIG. 12.

Figure 13:
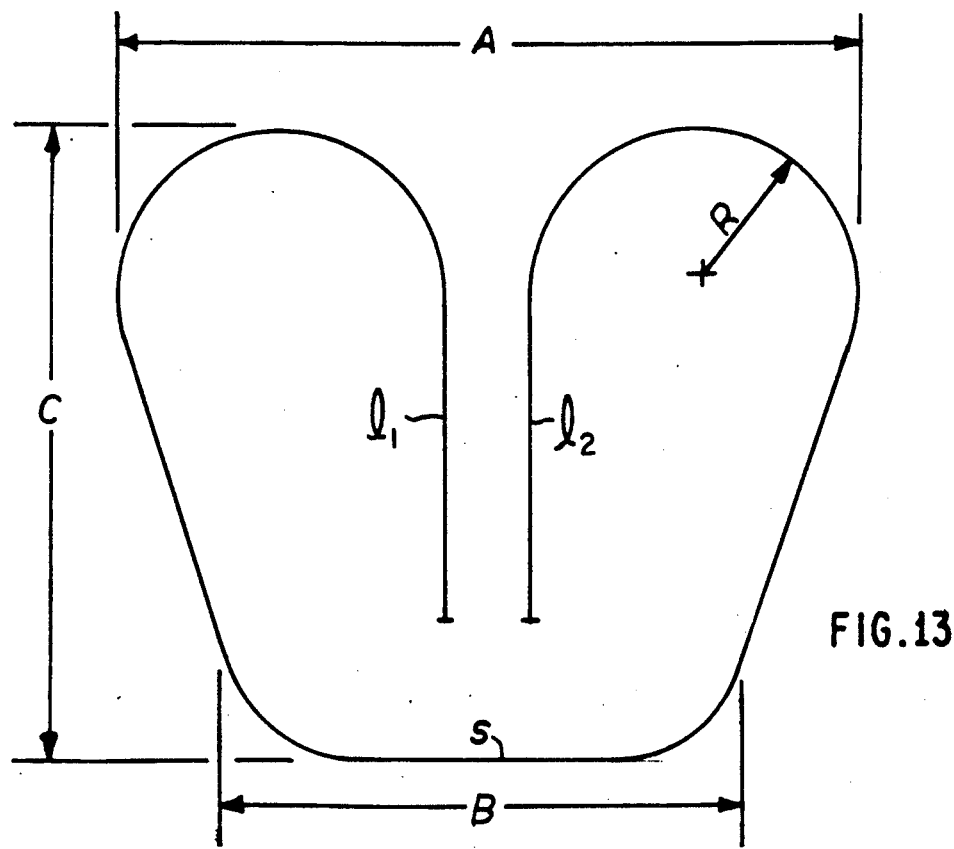

FIG. 13 shows another substantially planar loop design embodying this principle. The parameters of width A, straight section length B, height C and radius R can be varied to achieve different operating characteristics.

ELECTRONIC DESIGN

Figure 14:
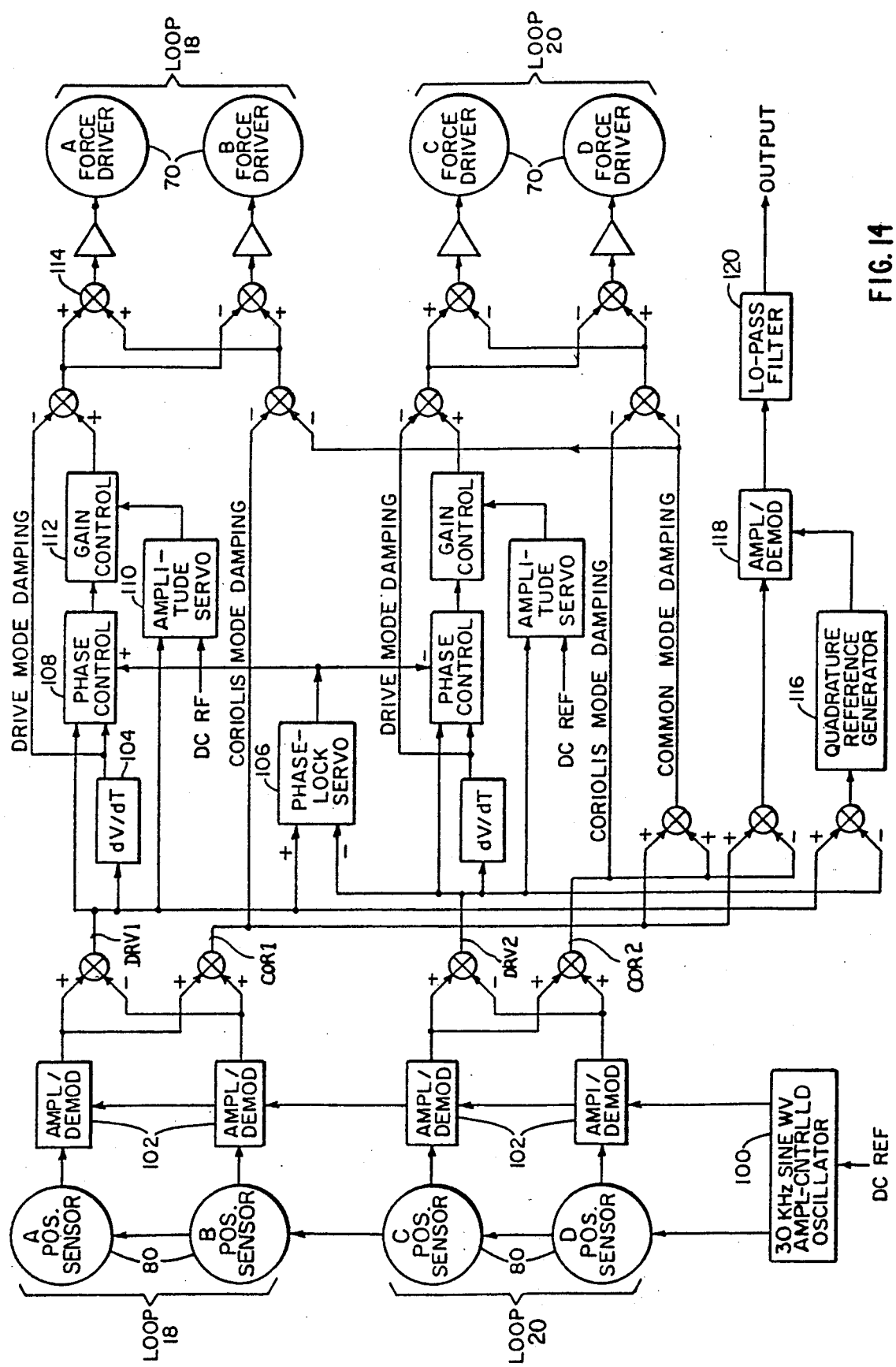
FIG. 14 is a functional block diagram of an electrical circuit for the drivers and detectors associated with the perpendicular and in-line embodiments of FIG. 1 and FIG. 7.

Two different electronic control and sensing systems are shown in FIGS. 14 and 15, respectively. Both are designed for use with two loops, each equipped with a pair of drivers and sensors.

For loop 18, positions A and B at the lower corners 38 and 40 are occupied by respective sensors and drivers. Likewise, positions C and D at the ends of the lower straight section of loop 20 are occupied by corresponding sensors and drivers. As shown in FIG. 14, the four position sensors, preferably variable differential transformers, are excited by a 30 kHz sine wave from oscillator 100. The outputs of the transformer coils are demodulated by respective amplitude demodulators 102 and fed to sum and difference circuits as shown. At this point, the idealized output voltage of sensor A can be represented as:

$$V_A = A_D \sin \omega t + A_C \cos \omega t$$

The desired output of the B sensor will be of the form:

$$V_B = -A_D \sin \omega t + A_C \cos \omega t$$

The sine term represents the drive mode motion and the cosine term 90° out of phase with the sine term, represents the Coriolis mode motion. The difference of these voltage signals (DRV1) doubles the drive signal and cancels the Coriolis term. The sum of these voltage signals (COR1) doubles the Coriolis term and cancels the drive signal. The derivative of the drive term DRV1 out of differentiator 104 transforms the signal to the cosine which is used as the drive signal. This operation puts the drive signal in phase with tube velocity as desired to reinforce the natural resonant frequency. A similar sine drive mode term (DRV2) is derived from loop 20's position sensors C and D and compared, if necessary, with the drive mode term from loop 18 in phase lock servo 106. The error signal from circuit 106 is used in phase control block 108 as a control signal to rotate the phase if necessary by adding back a little of the sine component to the derivative term. The drive mode term (sine) DRV1 is compared with a DC reference by an amplitude servo 110 and fed to gain control amplifier 112 to adjust the amplitude of the drive signal to the driver 70 to maintain average amplitude of the drive output term constant. Instead of an amplitude servo 110, the amplitude of the sine drive mode term can be allowed to vary and simply be monitored and ratioed in the output of the drive circuit.

The phase and gain adjusted signal is compared to the drive mode damping signal from the differentiator 104 and fed via summer 114 and an amplifier to force driver A on loop 18. Summer 114 adds in a Coriolis mode term and a common mode damping term if necessary. Coriolis mode damping uses the cosine term COR1 or COR2 to drive in the Coriolis mode in the opposite direction at the Coriolis mode resonant frequency in response to a spurious increase in Coriolis mode motion due, for example, to centrifugal acceleration of the flow.

Common mode damping is provided by summing the reverse Coriolis terms COR1 and COR2 from the respective loops to see if they are not equal and opposite. This term is added to the Coriolis term before compensating the drive signal in summer 114.

The B force driver signal is derived in exactly the same way except that the drive mode signal is reversed. The drive signals for drivers C and D on loop 20 are similarly derived in a corresponding manner.

The output signal designed to track Coriolis mode motion is derived in the following way. First, the Coriolis mode terms are summed. Using the drive mode motion signals, a quadrature reference 116, 90° out of phase with the drive signal, is produced. The quadrature reference is used to synchronously demodulate the Coriolis signal. The output of the demodulator 118 is passed via a low pass filter 120 to remove noise. The synchronous demodulation step purifies the Coriolis term by removing components in phase with the drive signal and yields a DC output which provides a measure of mass.

Common mode damping and phase locking between the two loops may be necessary with some configurations within the scope of the invention or with some applications. However, in prototypes of the embodiment of FIG. 1, common mode damping and phase locking between loops have been found to be unnecessary.

The circuit of FIG. 15 has certain differences and possible advantages over the circuit of FIG. 14 but also employs many of the same features. In particular, as in FIG. 14, the circuit of FIG. 15 derives the drive output signal from the differentiated gain controlled sensed drive component and synchronously demodulates the Coriolis deflection mode signal with a reference signal in quadrature with the sensed drive component to produce the flow output signal of the meter. There are significant differences, however, in channel layout and imbalance correction signal systems.

Figure 16:
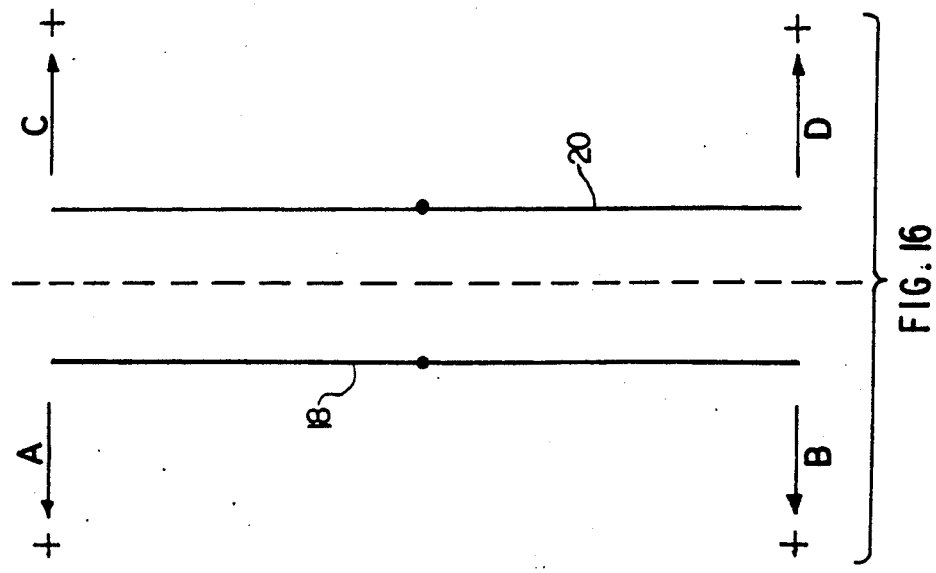
FIG. 16 is a schematic illustration of tube end displacement polarity assignments for the circuit of FIG. 15.

As in FIGS. 1 and 14, sensor positions are defined at the ends of two symmetrical parallel elongated loops of tubing. The first tube has ends A and B; the second tube has an end C opposite end A of the first tube and an end D opposite end B of the first tube. Positive deflection of a tube end is defined, as in FIG. 14, as motion away from the other tube as indicated in FIG. 16. Remember that Coriolis force is proportional to drive mode velocity, mass flow and some geometric constants. Coriolis force causes the tubes to oscillate in the Coriolis mode. This resultant oscillation is approximately 90° out of phase with the drive mode oscillation.

As in the circuit of FIG. 14, the position sensors 80 are variable transformers which are excited by a high frequency sine wave signal from oscillator 100. The output of each sensor is a 30 kHz suppressed carrier amplitude-modulated by the tube position. As shown in FIG. 15, the outputs of each pair of sensors, A and C or B and D, are connected in parallel via a summing junction to respective amplifier/demodulator circuits 102a and 102b.

"Channel A" is defined to include paralleled sensors/drivers A and C while "channel B" is defined to include paralleled sensors/drivers B and D.

The frequency and phase of the sine wave output of oscillator 100 is represented by a square wave reference signal, generated, preferably, by a simple comparator (not shown). The reference signal is used for synchronous demodulation (102a, 102b) to recover the deflection-modulated amplitude of the 30 kHz carrier. Demodulation can be carried out by a pair of complementary switches controlled by the reference signal alternately passing inverted and noninverted versions of the amplified deflection signal in synchronism with the reference frequency. The outputs of the demodulators 102a and 102b are combined in sum and difference circuits 140a and 140b and filtered in low pass filters 142a and 142b. The sum and difference signals contain large ripple components (harmonics of 60 kHz) along with the tube position information. The output of filter 142a is a signal (CORPOS) representing Coriolis mode deflection proportional to the sum of the A, B, C and D deflections. The output of the corresponding channel filter 142b is a signal (DRVPOS) representing drive mode deflection proportional to the sum of the A and C minus the sum of the B and D deflections. The sign and relative scale factors of the Coriolis and drive mode deflection signals are preserved.

Note that the filtering to reduce the ripple is done after the summing and differencing. Otherwise, a differential phase error before the signals are summed to cancel the drive component would give rise to a quadrature signal in the Coriolis mode deflection signal which would appear as a zero shift in the flow measurement. The requirement remains, however, for matching the filters because the demodulation reference signal derived from DRVPOS must be properly phase related to CORPOS.

Drive mode oscillation is produced by feeding the DRVPOS signal, corrected for gain and phase, to the force drivers in both channels allowing it to self-oscillate at the mechanical resonant frequency of the drive mode. The same basic drive signal is thus used for channels A and B. In particular, with reference to FIG. 15, the DRVPOS output of filter 142b is differentiated by a series capacitor-type circuit 104 to create a signal in phase with the velocity of the tubes. The amplitude of the differentiated signal is controlled by a linear attenuator 112 whose gain is controlled by an amplitude control circuit 110. Amplitude control is implemented by developing the amplitude of the DRVPOS signal with a precision average responding full wave rectifier, measuring the amplitude by subtracting its output from a precision DC voltage reference, integrating the difference, phase compensating and controlling the gain of the drive loop as a function of the integrated error signal. To prevent tube oscillations from overshooting during power up, a slow start function is provided by a long time constant on the DC reference output. The output of attenuator 112 is a signal DRV which provides the inputs to the drive amplifiers which supply current to the drive motors. The drive servo loop is thus closed by differentiating DRVPOS, adjusting the loop gain with a voltage variable linear attenuator and feeding positive and negative DRV to the drive amplifiers.

In order for the drive mode oscillation to occur at the mechanical resonant frequency, the drive force applied to the tubes should be in phase with the first derivative of the tube position (velocity). The present circuit lags the ideal phase because of the low pass filter preceding DRVPOS. In addition, a damping network is employed on the actuators. These filters are all desirable to prevent the 60 kHz ripple from the sensors from causing saturation in the drive amplifiers. The small frequency error that results from the phase error does not appear to cause problems although it would be possible to add a phase correction network if needed. Phase compensation may be included in the differentiator 104 if desired.

The signal DRV is fed via summing junction 146 to sum and difference circuits 148a and 148b for the respective channels. The outputs of sum and difference circuits 148a and 148b are fed via respective drive amplifiers 150a and 150b to the coils of the actuators 70A, B, C and D. The pairs of actuator coils for the A channel, namely, drivers A and C, are connected in series as shown. The B channel drivers are similarly connected. Note that the DRV signal applied through the difference circuit 148b is 180° out of phase with that coming through the sum circuit 148a as indicated by the opposite polarity of the inputs. As explained below, three other signals are available to add into the drive signal, namely, Coriolis mode damping, auto zero error and auto zero drive to compensate for imperfect balance between drive forces at opposite ends of the same tube.

The CORPOS output signal from filter 142a contains the flow information. The flow signal component is almost in quadrature with the DRVPOS signal (not exactly because of the finite Q and proximate frequency of the Coriolis mode resonance). The CORPOS signal is analyzed in a three-way synchronous demodulator 152 shown in more detail in FIG. 17. First, the CORPOS signal has its DC component (static tube position error) removed by RC network C30-R50. The signal is amplified to become CORAC. The CORAC signal is the one which is actually fed to the three individual demodulators. Only one of the demodulators "Q DEMOD" circuit 118 (FIG. 15) is utilized in recovering the mass flow information. The other two demodulators "I DEMOD" circuit 154 and AUTO ZERO DEMOD circuit 156 produce error signals representative of imbalances in the system which are intended to be nulled by the drive circuitry. Thus, the I and auto zero demodulators 154 and 156 introduce correction factors while the Q demodulator 118 is part of the flow signal processing circuit.

The CORAC signal is full-wave-demodulated in Q DEMOD 118 by a reference signal in precise quadrature with the DRVPOS signal. This phase relationship provides rejection of any residual gain imbalance in the position sensor circuits which could otherwise cause flow zero errors. It also may minimize flow scale factor errors due to variations in frequency proportionality caused by product density change.

Figure 17:
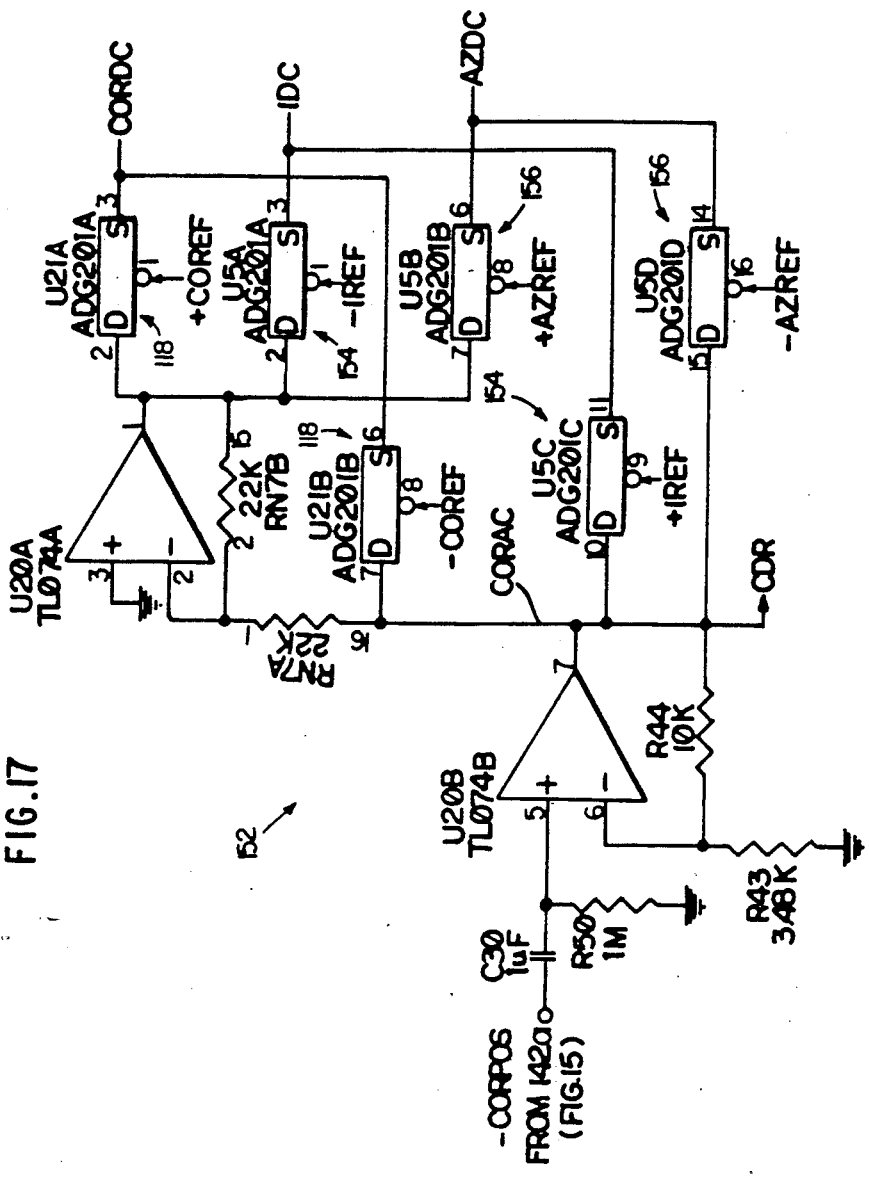
FIG. 17 is a detailed electrical schematic of the three part demodulator circuit of FIG. 15 which acts on the Coriolis mode deflection signal.

In FIG. 17, each full wave demodulator comprises a pair of gates which alternately passes the inverted or noninverted CORAC signal. In the case of the Coriolis demodulator 118, the gates are controlled by the complementary signals plus and minus COREF, square waves, which together comprise the quadrature reference (QREF, FIG. 15). The demodulated Coriolis signal CORDC is low pass filtered by a Bessel filter to reduce the ripple without distorting the transient response of the flow signal. The anti-aliasing property of the low pass bessel filter prevents signal-to-noise degradation of the flow signal for data sampling rates at least twice the (stop band) cutoff frequency of the filter. Consequently, continuous signal averaging is not a requirement.

The flow output is digitized and corrected for frequency and temperature by a microprocessor system (not shown). Frequency compensation is required for the flow measurement because the Coriolis signal is a function of the angular velocity of the drive oscillation. Since the displacement is held constant, the Coriolis signal will vary in proportion to drive oscillation frequency. The principal causes of frequency shift are product (sample) density changes, and temperature effects on the modulus of the tube.

The in-phase demodulator 154 is used to correct gain balance between the A and B channels. A flow zero error would be introduced by a DRVPOS component superimposed on the CORPOS signal combined with imperfect rejection of in-phase signals in the Coriolis DEMOD. This effect is caused by unbalanced gains in the A and B sensor channels. The DRVPOS component is not completely rejected by the Coriolis demodulator because of reference phase error. Gain imbalance between channels A and B is sensed by demodulating the CORAC signal with an in-phase reference (IREF) to detect a DRVPOS component in the CORPOS signal.

Figure 18A:
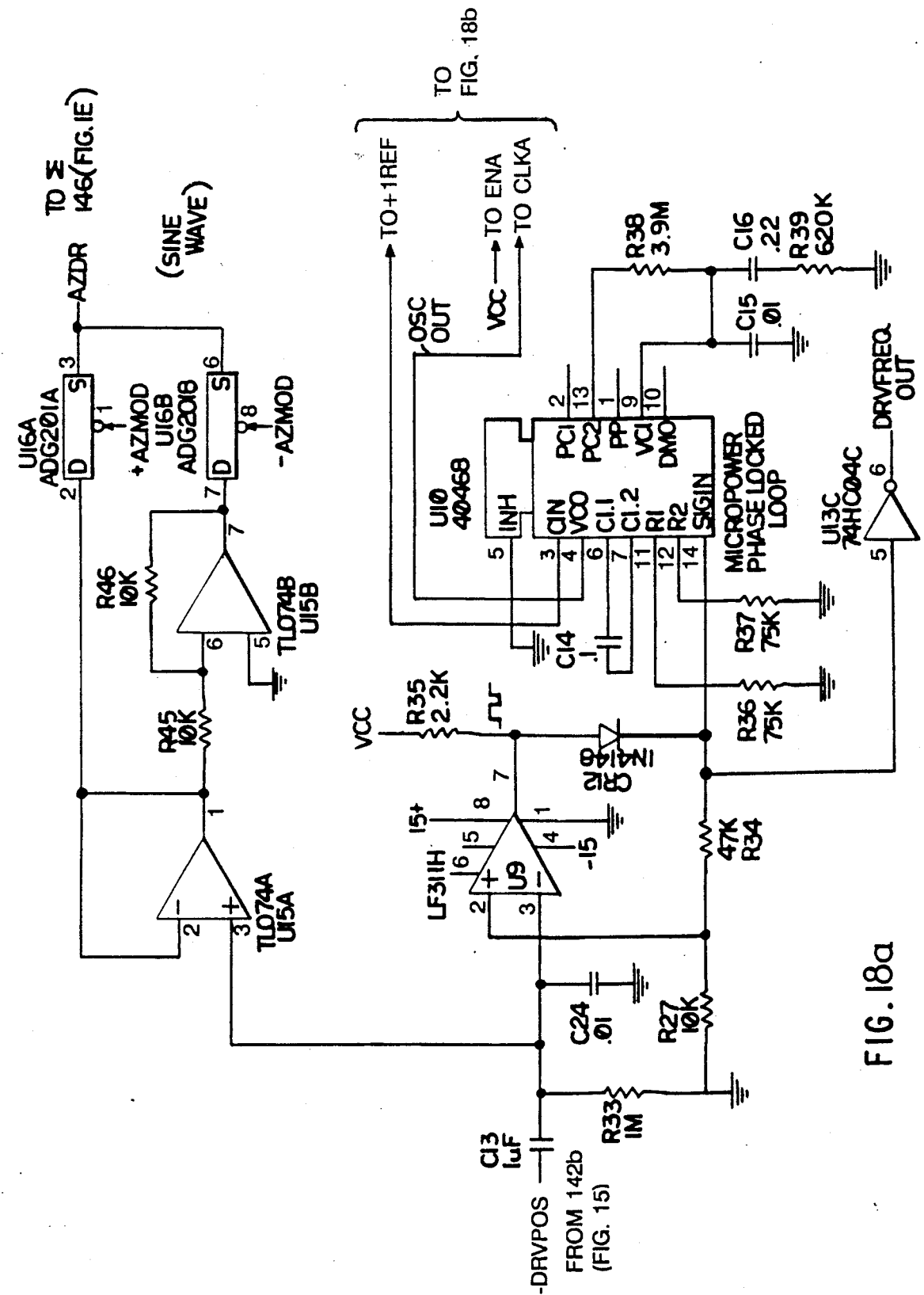
FIG. 18 is a detailed electrical schematic of the phase locked reference generator of FIG. 15.
Figure 18B:
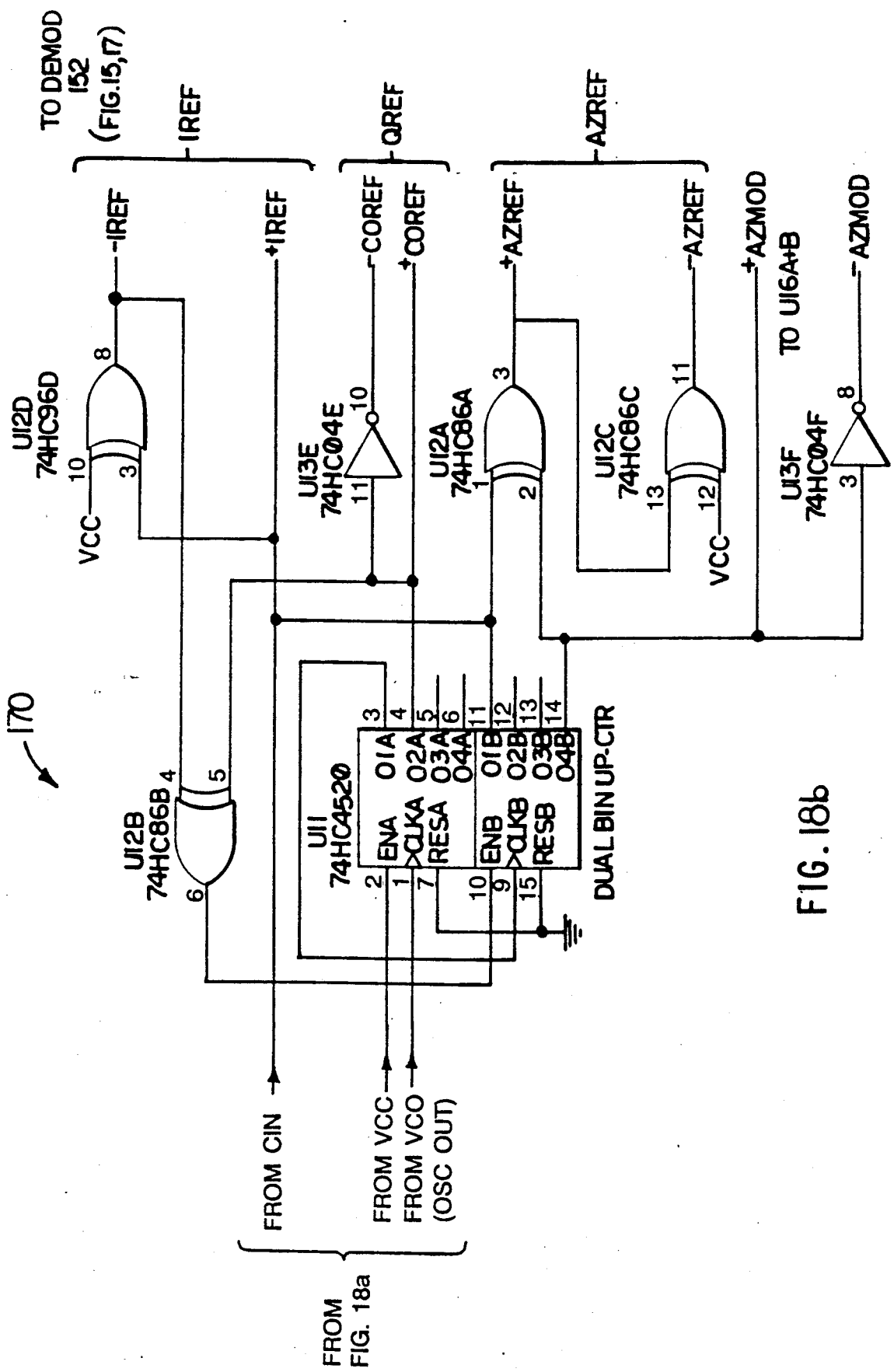

As shown in FIG. 18, the full wave synchronous rectifier employs complementary reference signals plus and minus IREF which together form the in-phase reference signal. The output of the in-phase demodulator, IDC, is integrated and fed back to a linear attenuator circuit 160 inserted between the outputs of the B and D sensors and the 30 kHz demodulator 102b. The gain of the other channel. i.e.. the A channel, is fixed to provide approximately 8 volts peak, for example, during peak excursion of the tubes in the zero flow case. This allows for a flow signal component to be superimposed without exceeding the 10 volt amplifier limit. The variable gain of the B channel is actively controlled by the voltage controlled gain circuit 160 to match the gain of the A channel.

The third demodulator, auto zero circuit 156, serves to correct another subtly different type of imbalance: imperfect balance between drive forces at opposite ends of each tube. This type of imbalance gives rise to a translational force component in phase with drive mode oscillation. The use of linear actuators, a moving magnet, for example, with iron poles on both armature and stator in combination with very high Q mechanical structures may eliminate the need for drive imbalance correction.

In the circuit of FIGS. 15 and 17, the drive force balance is measured by applying a sinusoidal test or perturbation signal AZDR to the drive amplifiers in quadrature with the normal drive signal. If there is indeed an unbalance in the drivers, a signal appears in CORAC (CORPOS minus DC component) in quadrature with the normal Coriolis flow signal (i.e., in phase with DRVPOS). This signal is demodulated in auto zero demodulator 156 using a special auto zero reference signal. The demodulated signal AZDC is integrated and used to control the drive balance. The signal AZDC is a balance error signal. The drive input signal is multiplied in circuit 162 by the balance error signal AZDC. The product, in phase with DRV, is applied with the same polarity to both sum and difference circuits 148a and 148b. Thus, the effect will be to increase the magnitude of the drive signal in one channel while reducing the magnitude of the drive signal in the other. The effect should be to null the balance error signal AZDC.

The test signal AZDR in quadrature with the normal drive signal would cause a gradual rotation of drive phase if continuously applied. To avoid this, the polarity of the perturbation signal AZDR is reversed every four cycles of drive. Since the polarity of resulting spurious signal appearing in CORAC also reverses, the synchronous demodulation reference must reverse polarity as well. Ideally, the response of the gain balance loop (the integrated output of the in-phase demodulator 154) must be slow enough not to respond to the auto zero control signal.

A reference generator 170 phase locked to DRVPOS produces three different square wave references for the three synchronous demodulators 152 which act on the CORPOS signal (CORAC in FIG. 17) signal. As shown in FIG. 18, the analog signal minus DRVPOS is first stripped of any DC component by RC circuit C13-R33 which matches C30-R50 in FIG. 17 for phase compensation. The DRVPOS signal, with its DC component removed, is fed to comparator U9 which generates a positive transition when its input signal crosses zero in the negative going direction. (Only the timing of the unused negative output transition is affected by the hysteresis of the comparator.) The output of the comparator is inverted and fed out as DRVFREQ for digital conversion for use in meter reading software (not shown). The comparator output is also passed as an input signal SIGIN of a micropower phase locked loop integrated circuit U10, including a voltage controlled oscillator (VCO) which oscillates at four times the frequency of SIGIN and is phase locked via clock input CIN. The fourfold faster frequency output VCO is fed to a dual bin up counter integrated circuit U11 as the clock input CLKA for bin A. The clock input CLKB for the bin B is provided by the first stage output of the A bin Q1A.

The timing relationship of the key signals associated with the reference generator 170 is shown in FIG. 19. The synchronous demodulator reference signals are derived from the output stages of the dual bin up counter U11. In particular, the in-phase reference (and its complement) is provided by output Q1B which is also the phase locking clock input CIN to the VCO. The quadrature reference 90° out of phase with the drive signal appears at Q2A. Q4B is "high" for four whole cycles of SIGIN and is used as to produce AZMOD which is employed to reverse the polarity of the perturbation signal AZDR. The signal modulated by AZMOD is a phase shifted analog version of DRVPOS. The synchronous demodulation reference for the auto zero demodulator 156 is provided by the EXCLUSIVE OR combination of Q1B and Q4B as shown in FIG. 19.

Coriolis mode damping for negative feedback is implemented by differentiating and scaling the CORAC signal (FIG. 17) and feeding it to sum and difference circuits 148a and 148b. The Coriolis mode damping signal CDR is, of course, in quadrature with the normal drive signal. CDR is applied with the same polarity on both channels. CDR is presently adjusted or scaled to reduce the flow signal by 1%.

Use of a single low precision reference element is recommended. If the A to D converter receiving the mass flow signal uses the system reference (e.g., 10 volts) for calibration, the measurement will become ratiometric, thereby reducing the tolerance and stability requirements for the reference regulator.

The advantages of the invention and foregoing embodiments are numerous. In particular, the independently controlled dual drive system for each loop eliminates imbalances and deflections along the length of the straight section 26 which could be caused by a single oscillatory drive on the axis 80 and permits separate control of both ends to perfect the motion. Having the detectors right at the drivers insures that the system drives and senses the correct mode. The overall symmetry of the configuration adds to its stability. The rigid central manifold acts with the node plate as mechanical ground while the two pairs of straight legs 22, 24 in complementary torsion exhibit a tuning fork effect in combination with the rigid block to reduce vibration of the block itself. Because of the orthogonal orientation of the loops, the axial pipeline length consumed by the meter of FIGS. 1-6 is minimized as shown by length 1 in FIG. 2. In the alternate configuration of FIGS. 7 and 8, while the length l' consumed along the pipeline is far greater, the extension of the meter, i.e , the transverse width w' as shown in FIG. 7 is greatly reduced. The in-line embodiment of FIGS. 7 and 8 may also tend to eliminate zero offset better than the perpendicular version, i.e., when the flow is stopped.

The oscillation of the straight section 26 exhibits a total linear displacement at each end far less than the diameter of the pipe segment. In fact, in successful prototypes, the excursion has been approximately on the order of 10% of the diameter of the pipe.

The electronic drive control and measurement circuitry, based on analog signal processing, eliminates the need for tracking the absolute amplitude of tube deflections. Instead, the system is based on phase measurements. The sensed signal is employed to develop the self-oscillating drive signal. Grouping of the drivers and sensors into two channels of corresponding elements creates better symmetry and balance in the drive signals and more sharing of common elements. Channel gain imbalance and drive force imbalance are automatically corrected.

The foregoing embodiments are intended to be illustrative and not restrictive. For example, the loop orientation can be rotated 90° so that the long straight section 26 is vertical if desired. In fact many other orientations of the loop are possible without necessarily affecting the operation of the meter. While the symmetry of the device can be changed, it is desirable since it allows reversal of components without affecting the operation of the instrument. Without affecting the overall design, the meter can be produced in parallel flow loops as shown in the drawings or in series flow for low flow rates by simply stocking parallel and series manifolds. Moreover, arms 60 and 62 are not essential; the detector and drive assemblies can be mounted directly to the loops themselves although the meter might be more susceptible to common mode motion.

The electronic circuitry disclosed herein is designed specifically for dual loop oscillating conduit Coriolis mass flowmeters. However, most aspects of the circuitry will be understood by those skilled in the art to have direct application to single loop or other plural loop systems: for example, synchronous quadrature and in-phase demodulation of the CORPOS signal to derive flow information and channel gain imbalance control signals, respectively. The electronic drive control and measurement system will work with a variety of sensors and drivers. However, linearity with respect to spacing is a desirable trait for both sensors and drivers. Indeed, sufficient linearity may eliminate the need for certain imbalance corrections.

While the control and measurement circuitry illustrated herein is preferably analog, except for some reference signals, many of the functions could be executed in digital circuitry or in software without departing from the underlying principles.

Many other modifications, additions and/or subtractions from the illustrated embodiments may be made without departing from the spirit or scope of the invention, which is indicated by the appended claims and equivalents thereto.

I claim:

1. A signal processing and control method for a Coriolis-type mass flowmeter having several oscillating conduit sections, comprising
   oscillating a conduit section, detecting the displacements of the respective ends of said section and producing two corresponding complementary sensor outputs, each including a drive component and a Coriolis component,
   recovering the drive component from the two sensor outputs,
   controlling the oscillation of each conduit in accordance with the drive signal derived from the recovered drive component,
   applying complementary forms of said drive signal to complementary force drivers at opposite ends of each section, and
   developing a signal indicative of drive force imbalance between the complementary force drivers.

2. A signal processing and control method for a Coriolis-type mass flowmeter having several oscillating conduit sections, comprising
   oscillating a conduit section, detecting the displacements of the respective ends of said section and producing two corresponding complementary sensor outputs, each including a drive component and a Coriolis component,
   recovering the drive component from the two sensor outputs,
   controlling the oscillation of each conduit in accordance with the drive signal derived from the recovered drive component by applying complementary forms of said drive signal to complementary force drivers at opposite ends of each section, and
   compensating for drive force imbalance between the drivers at opposite ends of each section of said conduit.

3. The method of claim 2, further comprising
   adding to said drive signal a perturbation signal out-of-phase therewith.

4. The method of claim 3, further comprising
   periodically reversing the polarity of said perturbation signal so that phase rotation of the resultant drive signal due thereto tends to cancel out.

5. The method of claim 4, wherein the drive signal corresponds to the first derivative of the recovered drive component and the perturbation signal is in phase with the recovered drive component.

6. The method of claim 3, further comprising
recovering the Coriolis component from said two sensor outputs,
synchronously demodulating a signal representing said recovered Coriolis component with a reference signal in synchronism with said perturbation signal to produce a drive balance error signal, and
combining a signal representing said drive balance error signal with the complementary drive signals applied to drivers at both ends of each conduit section.

7. The method of claim 6, further comprising
periodically reversing the polarity of said perturbation signal so that phase rotation of the resultant drive signal due thereto tends to cancel out.

8. The method of claim 7, further comprising
generating an intermediate frequency signal phase-locked to the recovered drive component and at a frequency which is a multiple of the frequency of said recovered drive component,
counting transitions of said intermediate signal to produce a plurality of counter outputs,
logically combining said counter outputs to produce a square wave which reverses polarity after a predetermined number of cycles of said drive component,
modulating a signal representing the recovered drive component with said square wave reference to produce said perturbation signal of periodically reversing polarity, and
logically combining said counter outputs to produce a synchronous demodulation reference signal corresponding to said perturbation signal.

9. In a Coriolis-type mass flowmeter having at least one oscillating conduit section, the combination comprising
an oscillation drive system coupled to one conduit section to oscillate said section,
a detector system arranged to sense the displacement of the ends of said section producing corresponding complementary sensor outputs, each including a drive component and a Coriolis component,
a signal processing circuit connected to receive said sensor outputs for recovering said drive component,
said oscillation drive system including a pair of drivers coupled to opposite ends respectively of each conduit section, said drive signal being applied in complementary forms to said drivers respectively,
an error signal generator responsive to said output signals and having an output indicative of drive force imbalance, and
a drive force matching circuit adapted to compensate for imbalance between the drivers at opposite ends of a conduit section.

10. The apparatus of claim 9, wherein said drive force matching circuit includes a perturbation signal generator responsive to the drive component and having a perturbation output signal, and
a combining circuit having as inputs said drive signal and said perturbation signal and having an output forming a compensated drive signal.

11. The apparatus of claim 10, wherein said signal processing circuit recovers the Coriolis component, said perturbation signal being out-of-phase with said drive signal so as to produce an artifact in the recovered Coriolis component.

12. The apparatus of claim 11, wherein said drive force matching circuit further includes a perturbation signal synchronous demodulator connected to receive the recovered Coriolis component and having a demodulation reference input connected to receive a perturbation reference signal duplicating the phase and frequency of said perturbation signal and having an output signal indicative of drive balance error.

13. The apparatus of claim 12, further comprising
an algebraic combining circuit having as inputs said compensated drive signal and said drive balance error signal and an output forming a correction signal,
another combining circuit having as inputs said correction signal and said compensated drive signal and producing an output forming the drive signal to one of said drivers, and
another combining circuit having as inputs said correction signal and an inverted version of the compensated drive signal and having an output signal forming the drive signal to said other driver.

14. The apparatus of claim 13, wherein said perturbation signal periodically undergoes phase reversal so that phase rotation of the resulting drive signal tends to cancel out.

15. The apparatus of claim 14, wherein said perturbation signal is in phase with and at the same frequency as said drive component, said drive signal being a function of the derivative of said drive component.

16. The apparatus of claim 15, further comprising
a perturbation signal reference generator including
an oscillator phase-locked to said drive component and having an intermediate output frequency which is a multiple of the frequency of said drive component,
a counter responsive to transitions of said intermediate output frequency and having plural counter outputs,
a logic circuit responsive to said counter outputs and having an output of reversing polarity every predetermined number of cycles of said drive component,
a modulator connected to receive the recovered drive component and having a modulation reference input connected to receive said square wave reference and having an output forming said perturbation signal of periodically reversing polarity, and
another logic circuit responsive to said counter outputs and having an output forming a synchronous demodulation reference signal corresponding to said perturbation signal.

17. A correction system for a Coriolis mass flowmeter, comprising
at least one conduit,
a pair of force drivers at opposite ends respectively of a section of said conduit,
a pair of sensors at opposite ends of said section of said conduit arranged to sense the displacement of the ends of said section producing two corresponding sensor outputs,
a drive signal generator having an output forming a drive signal,
means for applying of said drive signal to said drivers respectively,
a perturbation signal generator having an output forming a perturbation signal out-of-phase with said drive signal, a combining circuit having said perturbation signal and said drive signal as inputs and having an output forming a composite drive signal representing an algebraic combination of said input signals, a combination circuit connected to receive both sensor outputs and having an output representing a combination of said sensor outputs, a detector connected to receive the output of said combination circuit and having an output indicative of any remaining artifact due to said perturbation signal which did not cancel out in said combination circuit because of an imbalance in said drivers.

18. The apparatus of claim 17, further comprising an algebraic combining circuit connected to receive the output of said detector and said composite drive signal and having an output representing an algebraic combination thereof and forming a compensation signal, and a first combining circuit connected to receive said compensation signal and one of said composite drive signals and having an output connected to one of said drivers, and a second combining circuit connected to receive said compensation signal and the other of said composite drive signal and having an output connected to the other driver.

19. A Coriolis-type mass flowmeter, comprising at least two nominally parallel conduit sections each having a similar resonant frequency of vibration, a pair of drivers at opposite ends of each section, each driver capable of forcing the respective end in either lateral direction in response to a drive signal, a drive circuit connected to said drivers, responsive to said resonant frequency, having first and second drive signal outputs, two of said drivers located at corresponding ends of said sections being connected to receive said first drive signal output, two other drivers at opposite corresponding ends of said sections being connected to receive said second drive signal output, corresponding ones of said drivers being interconnected such that the same drive signal applied to corresponding drivers forces the corresponding ends of the sections toward or away from each other.

20. A Coriolis-type mass flowmeter, comprising at least two nominally parallel conduit sections each having a similar resonant frequency of vibration, a pair of drivers at opposite ends of each section, each driver capable of forcing the respective end in either lateral direction in response to a drive signal, a pair of sensors at opposite ends of each section, each sensor having an output indicative of the magnitude of displacement of the corresponding end, a drive circuit connected to said drivers, responsive to said resonant frequency, having first and second drive signal outputs, two of said drivers located at corresponding ends of said sections being connected to receive said first drive signal output, two other drivers at the opposite corresponding ends of said sections being connected to receive said second drive signal output, said drivers being interconnected such that the same drive signal applied to corresponding drivers forces the corresponding ends of the sections toward or away from each other, and a signal processing circuit having first and second signal inputs and an output indicative of mass flow, the outputs of sensors at corresponding ends of the respective sections being coupled to said first signal input, the outputs of sensors at the opposite corresponding ends of said sections being coupled to said second signal input.

21. The flowmeter of claim 20, further comprising a control circuit connected between said signal processing circuit and said drive circuit to control said complementary drive signals as a function of said inputs to said signal processing circuit.

* * * * *

UNITED STATES PATENT AND TRADEMARK OFFICE
CERTIFICATE OF CORRECTION

PATENT NO. : 5,050,439

DATED : September 24, 1991

INVENTOR(S) : Duane T. Thompson

It is certified that error appears in the above-identified patent and that said Letters Patent are hereby corrected as shown below:

Col. 1, line 28, delete "," after "axis".

Col. 4, line 59, insert --going-- after "under".

Col. 18, line 64, insert --complementary forms-- after "applying".

Signed and Sealed this

Thirteenth Day of April, 1993

Attest:

STEPHEN G. KUNIN

Attesting Officer

Acting Commissioner of Patents and Trademarks